Nov. 27, 1934.    M. SCHENKEL    1,982,324
METHOD OF CHANGING FREQUENCIES BY MEANS OF STATIC APPARATUS
Filed Jan. 25, 1933    3 Sheets-Sheet 1
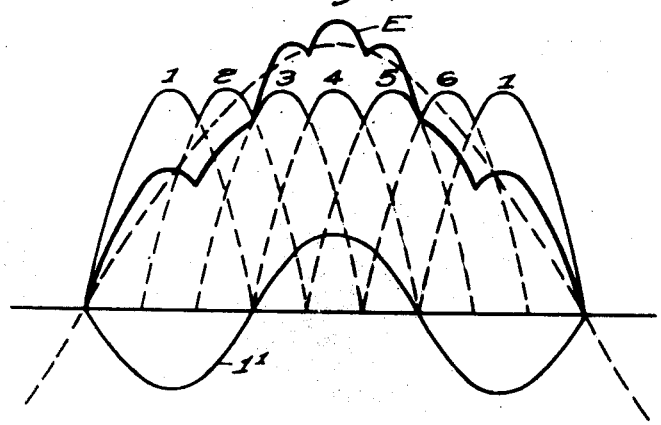
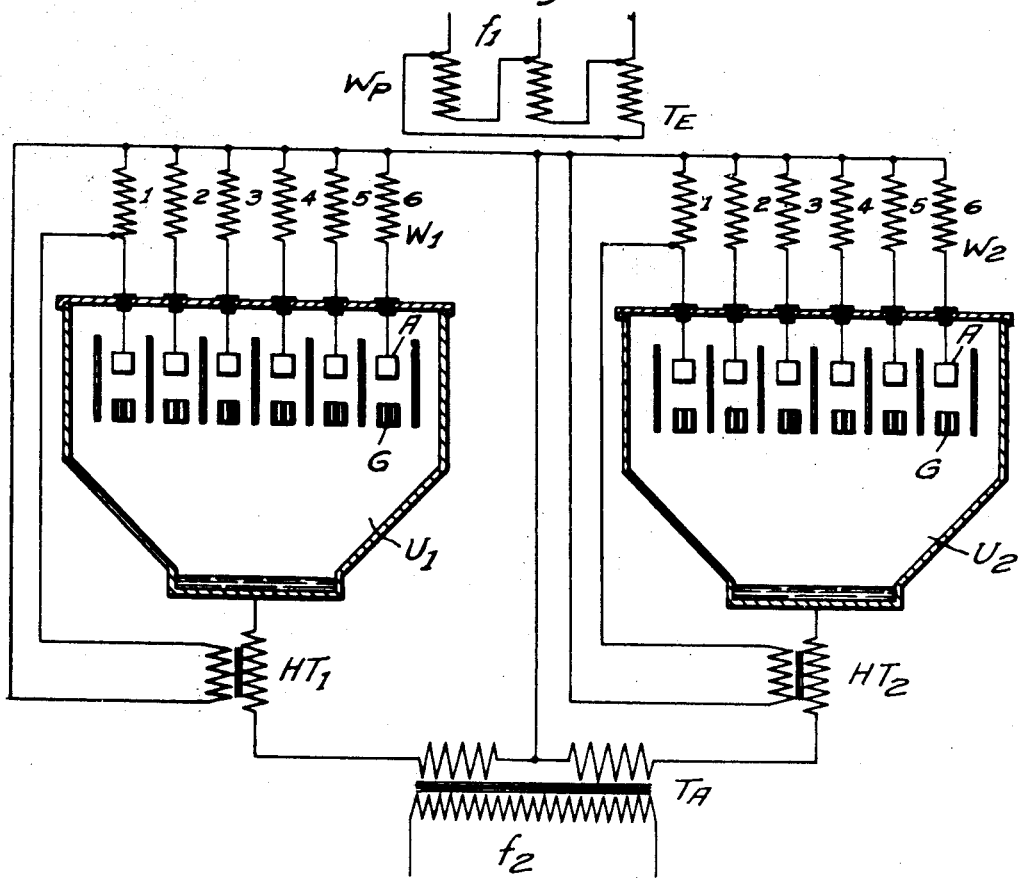
WITNESSES:
INVENTOR
Moritz Schenkel.
BY
ATTORNEY Nov. 27, 1934.   M. SCHENKEL   1,982,324
METHOD OF CHANGING FREQUENCIES BY MEANS OF STATIC APPARATUS
Filed Jan. 25, 1933   3 Sheets-Sheet 2

WITNESSES:   INVENTOR
   Moritz Schenkel.
   BY
   ATTORNEY

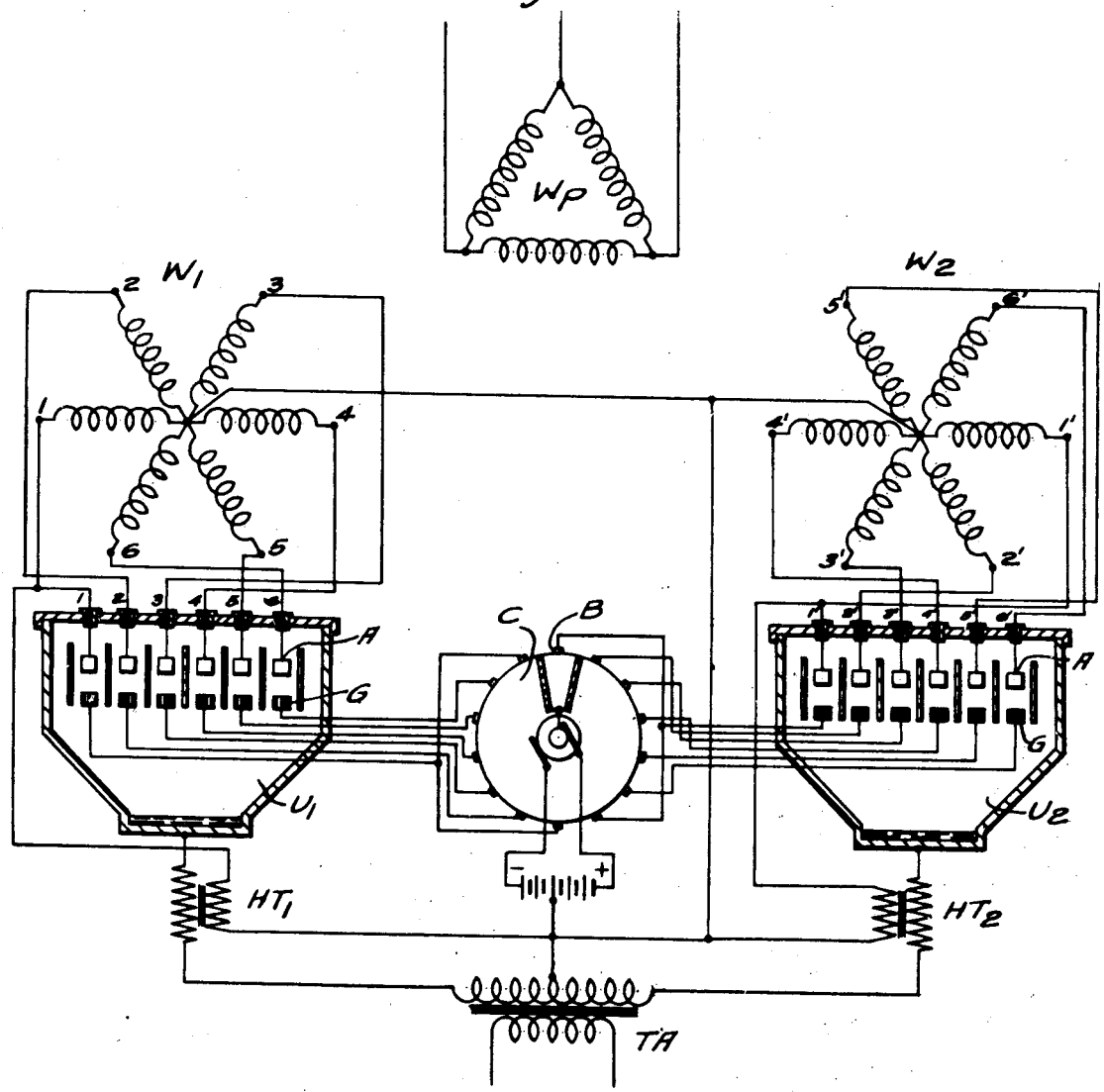

Patented Nov. 27, 1934

1,982,324

UNITED STATES PATENT OFFICE 1,982,324

METHOD OF CHANGING FREQUENCIES BY MEANS OF STATIC APPARATUS

Moritz Schenkel, Berlin-Charlottenburg, Germany, assignor to Westinghouse Electric & Manufacturing Company, New York, N. Y., a corporation Application January 25, 1933, Serial No. 653,491
In Germany February 6, 1932

5 Claims. (Cl. 172—281)

My invention relates to a frequency changer and particularly to a vapor-electric system for converting polyphase of a high frequency to single phase of a lower frequency.

In the operation of vapor electric frequency changers it is customary to use a pair of grid controlled rectifiers which alternately feed current to the primary of the lower frequency transformer.

Prior to my invention there have been two general systems for controlling such rectifier installations. One method consisted in providing grid control for each of the anodes of each converter and timing the grids to chop off unequal portions of the anode currents to build up a substantially sine wave on the primary of the low frequency transformers. The other method utilized a polyphase transformer having phase windings adapted to produce unequal phase potentials.

These expedients have been resorted to in an attempt to convert the ordinary flat-topped or square-shaped voltage wave produced by a rectifier into a substantially sinusoidal wave so that the low frequency wave form will be substantially sinusoidal in shape.

It is an object of my invention to provide a frequency conversion system using substantially standard rectifiers and standard rectifier transformers to produce a substantially sinusoidal wave form for the low frequency system.

In a rectifier system according to my invention the grids of the active rectifier are released in turn for substantially the full-wave time of each valve and the output voltage of the rectifier is modified by superimposing thereon the fundamental frequency of one phase of the high frequency system. This superimposing frequency by adding or subtracting from the output potential produces a substantially sinusoidal wave in the primary of the low frequency system.

I have found that this superimposed fundamental frequency may be introduced directly into the cathode lead or it may be superposed on the phase potentials of the rectifier transformer. In either event the fundamental subtracts from the initial and final active anode potentials and adds to one or more of the intermediate anode potentials.

Further objects and advantages of my invention will be apparent from the following detailed description taken in conjunction with the accompanying drawings, in which:

Figure 1 is a diagrammatic illustration of the method of building up a substantially sine-shaped voltage wave by impressing the fundamental frequency of one phase on the output potential of the regular standard transformer construction.

Fig. 2 is a schematic illustration of a rectifier system according to my invention.

Fig. 5 is a schematic illustration similar to Fig. 2 showing the application of the grid control device according to my invention.

Figure 3:
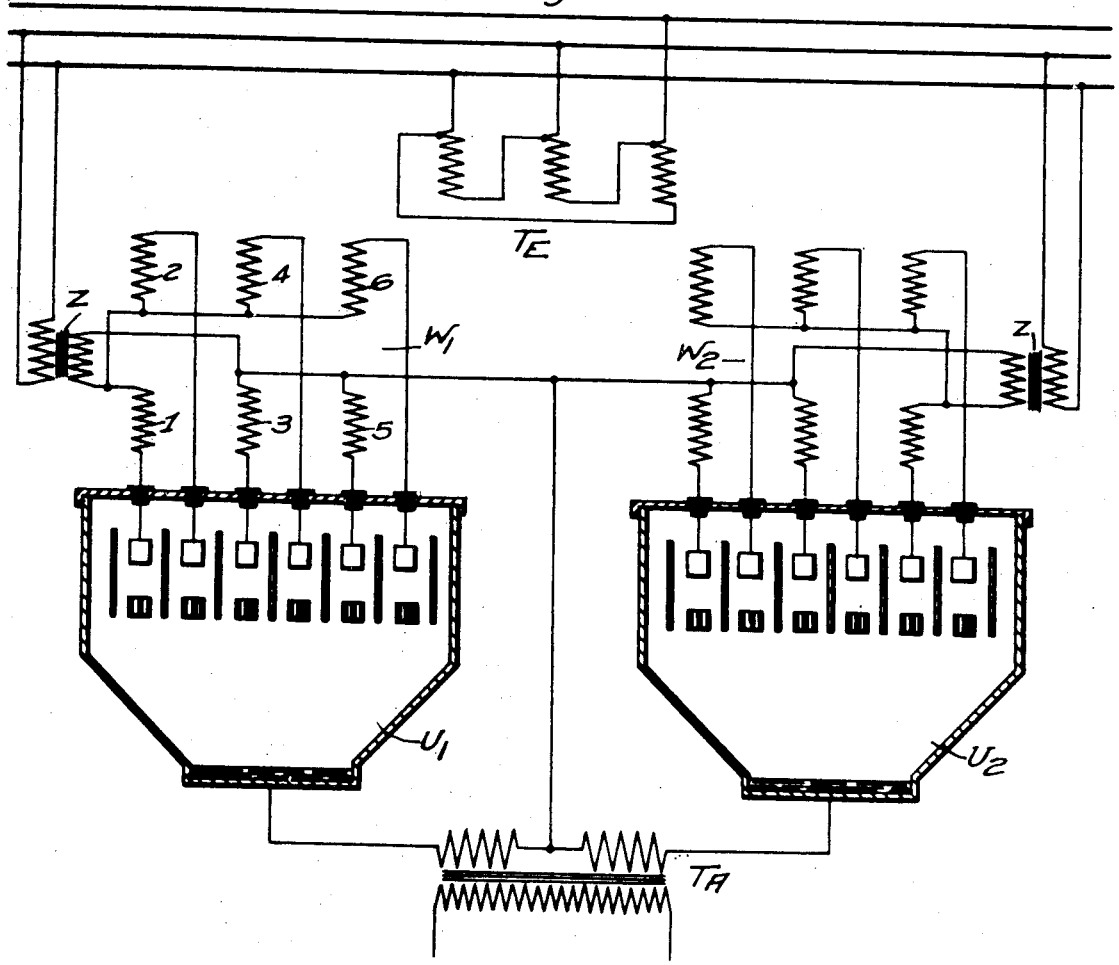
Fig. 3 is a similar view of a modification showing the super-position of the fundamental frequency on the phase windings of the supply transformer.

In the diagram of Fig. 1 curves 1 to 6 illustrate the normal unmodified potentials delivered by the rectifier anodes. As is obvious, these potentials if impressed on the primary of a transformer would produce substantially a flat-topped voltage wave. Curve 1' is the fundamental frequency of any phase such as 1 of the rectifier transformer. When this fundamental wave is properly superposed on the unmodified cathode potential it produces a modified cathode potential as illustrated at curve E. By means of a suitable smoothing reactor this curve approximates the sine wave shown by the dotted curve S.

The rectifier system according to my invention comprises a suitable polyphase winding $T_e$ having a delta-connected primary $W_p$ and a plurality of star-connected secondaries $W_1$ and $W_2$ shown for purposes of illustration as six-phase diametrical. Each of the secondary windings $W_1$ and $W_2$ supplies potential to the anodes of standard six phase rectifiers $V_1$ and $V_2$. Associated with one phase, such as phase 1 of each of the secondaries, is a primary of a rectifying transformer $HT_1$ and $HT_2$ coupled with a winding in the cathode lead from the rectifier. Each of the cathode leads is in turn connected to an end terminal of the primary of the low frequency transformer TA, the mid-point of which is connected to the star points of the high frequency secondary windings $W_1$ and $W_2$.

In the operation of this system the control grids G for each of the valves are connected to a suitable control system illustrated as the well-known rotary contact device C having contact brushes B for each anode of each of the individual rectifiers $V_1$ and $V_2$. These brushes B are so positioned that as the commutating disc C rotates, it will connect the anodes of one rectifier in sequence from 1 to 6 and then again reconnect anode 1. As it breaks with anode 1 of rectifier U₁ it will connect with anode 1' of rectifier U₂, anode 1' being substantially opposite in polarity from anode 1 of rectifier U₁. If the potential increases in phase 1 of the transformer secondary associated with rectifier U₁, the potential in the primary of the modifying transformer HT₁ also increases; then as the potential between phases 1 and 2 of the main transformer commutates the potential of the modifying transformer HT₁ will be at substantially a maximum value. However, as the current commutates between phases 2 and 3 of the secondary W₁ the potential of the modifying transformer HT₁ substantially returns to zero, and then increases as the commutation advances from 3 to 4 and begins to decrease as the commutation advances from phase 4 to 5 and finally is again maximum in a reverse direction as commutation occurs from phase 6 to 1 again. It is thus seen that the potential across the primary phase such as 1 can be superimposed directly on the potential delivered by the rectifier cathode. By properly selecting the direction and magnitude of this potential it produces a voltage characteristic E as illustrated in Fig. 1. The modified voltage E is impressed on half of the primary winding of the low frequency transformer TA. As soon as the cycle of rectifier U₁ has been completed the grid control device C connects the anode 1' to 6' of rectifier U₂ in substantially the same manner, as just described for rectifier U₁. The rectified potential of rectifier U₂ is fed in the opposite direction through half of the primary winding of the low frequency transformer producing with the halfwave just supplied by rectifier U₁, a complete cycle of substantially sinusoidal current in the secondary of the low frequency transformer TA.

In the modification according to Fig. 3 the primary phase frequency is inserted between the phase windings of the secondary W₁ or W₂ of the rectifier transformer in such manner that the potential of the modifying transformer Z is directly added to or subtracted from the terminal potentials of the phase windings of the rectifier secondary.

Figure 4:
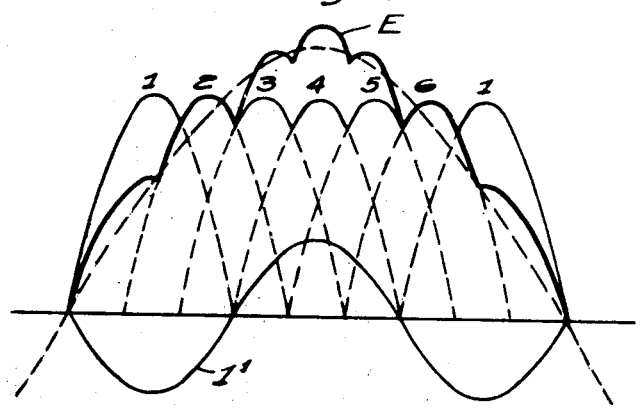
Fig. 4 is a view similar to Fig. 1 showing the wave form produced by modifying the phase potentials in the construction shown in Fig. 3.

This potential as shown by Fig. 4 is directly subtracted from anode 1 and directly added to anode 4 while anode potentials of anodes 3 and 5 are substantially modified by the auxiliary potential. This produces a composite voltage as shown by curve E of Fig. 4 which is readily modified by suitable reactors to approximate the sinusoidal curve S of Fig. 4.

While I have shown and described specific embodiments of my invention, it is apparent that changes and modifications can be made therein without departing from the true spirit of my invention or the scope of the appended claims.

I claim as my invention:

1. A vapor-electric conversion system comprising a polyphase supply system, a single phase load system, a pair of multi-valve rectifiers for passing current between said systems, a supply transformer for supplying polyphase power to said rectifiers, a single phase transformer connected to said rectifiers said transformer being connected to said load circuit and means for superposing a single phase voltage of the primary frequency on the output voltage of said rectifier in such a manner as to change the output voltage wave form of the rectifier to one of substantially sine form.

2. A vapor-electric conversion system comprising a polyphase supply system, a single phase load system, a pair of multi-valve rectifiers for passing current between said systems, a supply transformer for supplying polyphase power to said rectifiers, a single phase transformer connected to said rectifiers said transformer being connected to said load circuit, a transformer connected in the output circuit of each rectifier said transformer being connected to one phase of the supply transformer, the voltage of said transformer being superposed on the output voltage of the rectifier for changing the wave form applied to the single phase transformer.

3. A vapor-electric frequency converter comprising two alternating current systems of different frequency, a plurality of grid controlled rectifiers for transferring energy between said systems, grid control means for successively connecting said rectifier in current carrying relation to said circuits, and means for superposing a voltage of the fundamental frequency of one of said systems on the output potential of said rectifiers for modifying the wave form of said output potential to a wave form approaching sine form.

4. A vapor-electric frequency converter comprising two alternating current systems of different frequency, a plurality of grid controlled rectifiers for transferring energy between said systems, grid control means for successively connecting said rectifier in current carrying relation to said circuits, and an auxiliary transformer connected to one phase of one of said systems for modifying the potential wave form delivered by said rectifiers to one of approximately sine formation.

5. A vapor-electric converter for converting alternating current of one frequency to alternating current of a lower frequency, comprising a polyphase supply of the higher frequency, a transformer having the primary thereof connected to said supply, a plurality of polyphase secondaries associated with said primary, a multi-valve vapor electric device associated with each secondary, a low frequency load circuit, a transformer connected to said load circuit, the primary of said transformer having terminals connected to said vapor-electric devices, grids associated with each valve of said devices, a grid control device for successively releasing the grids of said valves in one of said devices while blocking the valves in the remaining devices, and transformers for supplying single phase of the frequency of the supply to the secondaries of the supply transformer for modifying the output voltage to an approximately sinusoidal value.

MORITZ SCHENKEL.